W. ORR.
Revolving Fire-Arms.
No. 148,742.                                        Patented March 17, 1874.
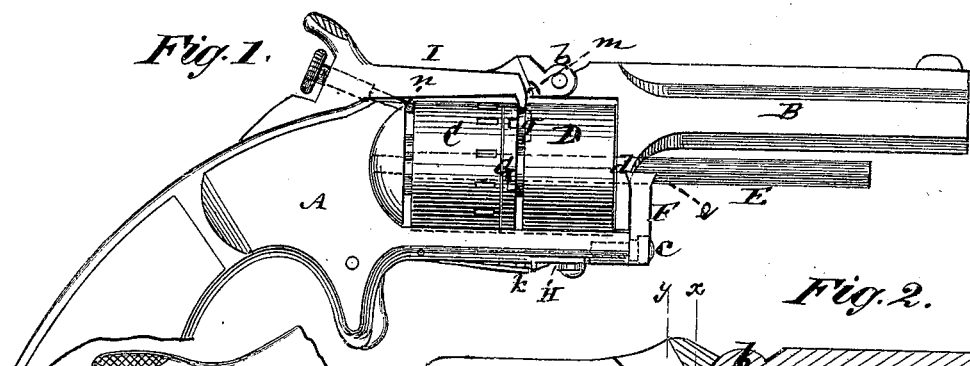
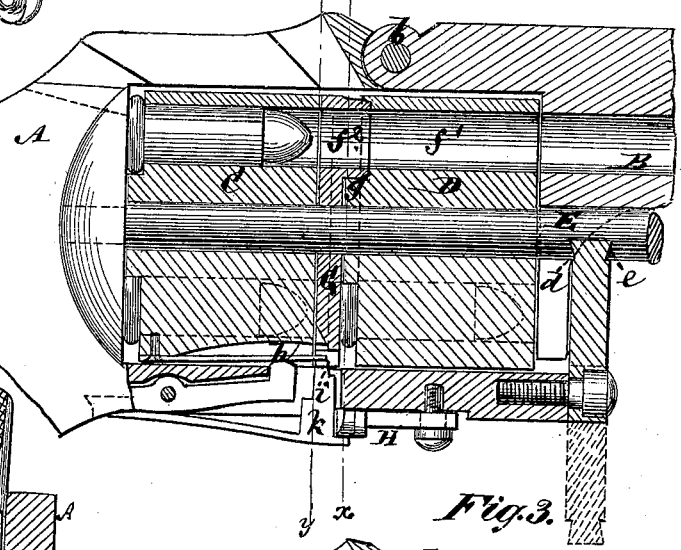
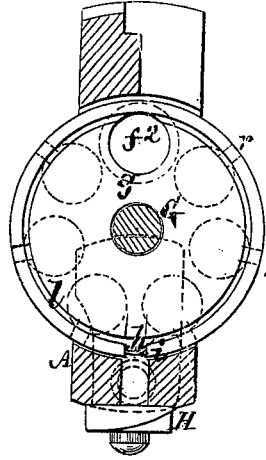
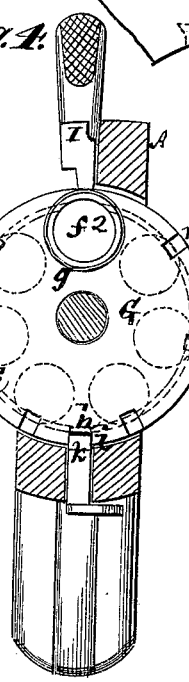
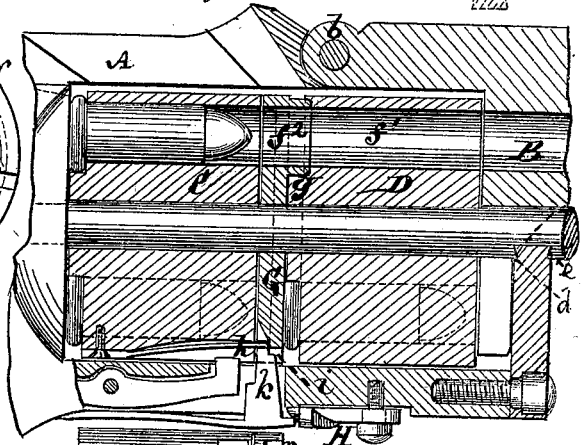
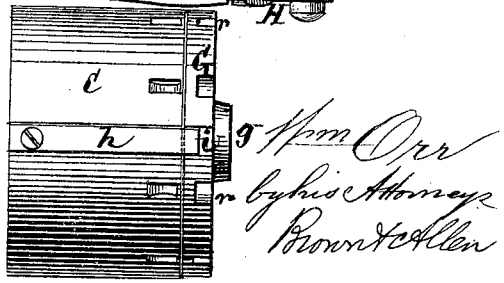
Witnesses
John Becker
Fred Haynes
Wm Orr
by his Attorneys
Brown & Allen

UNITED STATES PATENT OFFICE.

WILLIAM ORR, OF NEW YORK, N. Y.

IMPROVEMENT IN REVOLVING FIRE-ARMS.

Specification forming part of Letters Patent No. 148,742, dated March 17, 1874; application filed January 10, 1874.

*To all whom it may concern:*

Be it known that I, WILLIAM ORR, of the city, county, and State of New York, have invented certain Improvements in Revolving Fire-Arms, of which the following is a specification:

My invention principally relates to that description of revolving fire-arms in which a number of many-chambered cylinders, arranged the one behind the other and operated in succession to bring their chambers in line with the barrel, are used. The invention consists in various novel advantages, constructions, and combinations of parts, including an independent breech-piece or disk between the cylinders, and springs for revolving the same in connection with the cylinders, and of disconnecting the forward cylinders when required; also, a center stud or rod extended beyond the cylinders to form a clearer or shell-discharger for the latter; likewise, a swinging catch for holding the barrel to its place when down.

In the accompanying drawing, which forms part of this specification, Figure 1 represents a side view of a two-cylinder revolving fire-arm constructed in accordance with my invention; Figs. 2 and 3, longitudinal sections of the same, in part, with certain of the working details in different positions; Fig. 4, a transverse section on the line $x\ x$, looking toward the rear end of the fire-arm; and Fig. 5, a similar section on the line $y\ y$, looking toward the forward end of the revolver. Fig. 6 is a longitudinal view of the rear cylinder with its attached spring, and the breech-plate or spring which operates in connection therewith when the forward cylinder is being revolved. The several figures, from 2 to 6, inclusive, are upon a larger scale than Fig. 1.

Similar letters of reference indicate corresponding parts.

A is the frame and stock of the weapon, and B the barrel, hinged at $b$ to provide for its being thrown up or back when it is required to get at and remove or replace the many-chambered cylinders C D, which are arranged one in front of the other, and which are loosely fitted or slid to their places, with freedom to turn upon an elongated stud or rod, E. This rod E is made to extend considerably beyond the cylinders C D, and below and independent of the barrel B, so that said rod not only serves as a bearing for the cylinders to turn upon, but when the barrel is thrown up or back also serves as a clearer to remove the shells of the exploded cartridges from either or each cylinder in succession by working said cylinders over the rod as a stationary rammer or clearer. The barrel B is locked to its place, when down, by a catch, F, pivoted below, at $c$, and of dovetail or other equivalent construction on its upper edge, so that when turned up it enters a locking groove or notch, $d$, in a projection from the under side of the barrel, said catch also entering within a notch or groove, $e$, which may likewise be of locking construction, in the under side of the rod E, to firmly hold or bind the whole together. The cylinders C D are each constructed with a like number of chambers in them, but one, $f^1$, of the chambers in the front cylinder D is not a cartridge-holding chamber, or designed to be loaded, but simply to serve as a continuation between the bore of the barrel and each chamber in succession of the rear cylinder C. The two cylinders C D are arranged at a suitable distance apart, and from the inside end of the frame, to provide for using rim-fire cartridges, and the intermittent revolving motion to said cylinders in succession, to bring the loaded chambers of the one cylinder first in line with the barrel and then the other, is communicated primarily to the rear cylinder C through ratchet and pawl devices connected with said cylinder by the action of the hammer in cocking, and which, not being new, there is no necessity here to describe. The means, however, for first rotating the one cylinder and then the other are peculiar. Thus, while the primary motion, for intermittently revolving both cylinders, is communicated, by the cocking of the hammer, to the cylinder C, it is the front cylinder D that first discharges its loads; and to this end, and to establish a driving means between the two cylinders, there is introduced a disk or plate, G, which also serves as a breech-piece to the front cylinder D, said plate being only provided with a single opening, $f^2$, in line with the chamber $f^1$ of such forward cylinder, and retained in such position by a hollow teat-like projection, $g$, on the plate G or cylinder D, as desired. The connection between the rear cylinder and the disk G for the purpose of intermittently revolving the front cylinder D till the several chambers of the latter are discharged, is established by means of a spring, $h$, of the rear cylinder C flying outward into gear with a notch, $i$, of the plate G. This notch $i$ is opposite the opening $f^2$ in the plate G, and so soon as the forward cylinder D has completed a whole revolution and discharged its several cartridge-chambers, a stouter spring, $k$, than the spring $h$, resting on the periphery of the disk G, is caused to bear inward on the spring $h$ in the notch $i$ and force it into an annular groove, $l$, in the back of the disk, whereby the rear cylinder C is free to rotate to discharge its loads without revolving the front cylinder D. A cam-catch, H, serves to lift outward on the spring $k$ to liberate it from the notch $i$ after the rear cylinder C has been discharged in order to permit of the forward cylinder being driven again by the spring $h$, but this catch H, supposing the cylinders to have been reloaded, is afterward released to admit of the spring $k$ in due season operating as before. The hammer I is a double-pointed one, being formed with a forward nose, $m$, to strike, when required, on the rims of the cartridges in the front cylinder D, and with an adjustable screw-point, $n$, to strike on the rims of the cartridges in the rear cylinder C, said latter point being adjusted back or out of the way when the front nose $m$ of the hammer is required to act, and vice versa. Notches $r$ in the rim of the disk G, and of such lesser width than the notch $i$, or otherwise constructed so as not to admit of the spring $k$ entering them, provide for the front nose $m$ of the hammer to enter between the disk G and forward cylinder D.

I claim—

1. The combination of the independent breech-piece or disk G, opening $f^2$, and teat $g$ with the intermittently-revolving many-chambered cylinders C D, substantially as specified.

2. The springs $h$ $k$, in combination with the disk G, having the notch $i$ and annular groove $l$, and the many-chambered cylinders C D, essentially as described.

3. The rod E, fixedly attached to the recoil-bearing of the arm and arranged to extend independently of the barrel in front of the removable many-chambered cylinder or cylinders C D, in combination with the latter, the hinged barrel B, and the catch F, substantially as and for the purposes herein set forth.

WILLIAM ORR.

Witnesses:
FRED. HAYNES,
MICHAEL RYAN.